(12) United States Patent
Nau et al.

(10) Patent No.: US 7,937,941 B2
(45) Date of Patent: May 10, 2011

(54) METHOD FOR OPERATING AN INTERNAL COMBUSTION ENGINE

(75) Inventors: Michael Nau, Dornhan/Aischfeld (DE); Gunter Winkler, Stuttgart (DE); Dirk Hofmann, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 682 days.

(21) Appl. No.: 11/999,448

(22) Filed: Dec. 3, 2007

(65) Prior Publication Data

US 2008/0149077 A1 Jun. 26, 2008

(30) Foreign Application Priority Data

Dec. 20, 2006 (DE) .................. 10 2006 060 313

(51) Int. Cl.
- *F02B 33/44* (2006.01)
- *F02B 33/00* (2006.01)
- *G01M 15/00* (2006.01)
- *G06F 17/00* (2006.01)
- *G06G 7/70* (2006.01)

(52) U.S. Cl. ................. 60/605.1; 73/118.1; 701/103
(58) Field of Classification Search .............. 60/605.1; 73/118.1; 701/103
See application file for complete search history.

(56) References Cited

U.S. PATENT DOCUMENTS

| | | | | |
|---|---|---|---|---|
| 4,439,728 | A * | 3/1984 | Rickman, Jr. | 324/164 |
| 4,953,110 | A * | 8/1990 | Chartrand | 701/101 |
| 6,224,021 | B1 * | 5/2001 | Tanaka | 244/221 |
| 6,584,772 | B2 * | 7/2003 | Haupt et al. | 60/602 |
| 6,644,029 | B2 * | 11/2003 | Weinreuter | 73/112.05 |
| 6,665,604 | B2 * | 12/2003 | Arnold | 701/100 |
| 6,725,660 | B2 * | 4/2004 | Hidaka | 60/602 |
| 6,938,420 | B2 * | 9/2005 | Kawamura et al. | 60/612 |
| 7,181,959 | B2 * | 2/2007 | Matsumoto et al. | 73/118.1 |
| 7,380,446 | B2 * | 6/2008 | Baeuerle et al. | 73/118.1 |
| 2005/0155349 | A1 * | 7/2005 | Sugiura et al. | 60/605.1 |
| 2008/0109145 | A1 * | 5/2008 | Eiraku | 701/103 |
| 2009/0050119 | A1 * | 2/2009 | Inoue | 123/564 |

FOREIGN PATENT DOCUMENTS

DE 10 2005 056 517.4 6/2007

\* cited by examiner

*Primary Examiner* — Thai Ba Trieu
(74) *Attorney, Agent, or Firm* — Kenyon & Kenyon LLP

(57) ABSTRACT

A method for operating an internal combustion engine in which fresh air, under ambient pressure, is compressed with the aid of a compressor, in particular an exhaust gas turbocharger, and supplied to a combustion chamber of the internal combustion engine via a throttle device, the rotational speed of the compressor being ascertained with the aid of a sensor, in particular a pressure sensor, the rotational speed of the compressor being used for determining the ambient pressure or a boost pressure applied downstream from the compressor and upstream from the throttle device.

31 Claims, 2 Drawing Sheets

METHOD FOR OPERATING AN INTERNAL COMBUSTION ENGINE

FIELD OF THE INVENTION

The present invention relates to a method for operating an internal combustion engine.

BACKGROUND INFORMATION

A method for operating an internal combustion engine is discussed in German patent document DE 10 2005 056 517.4.

SUMMARY OF THE INVENTION

An object of the exemplary embodiments and/or exemplary methods of the present invention is to create a method for operating an internal combustion engine using which the configuration of the internal combustion engine can be simplified.

This object is achieved by a method and an internal combustion engine having the features described herein. Advantageous refinements of the exemplary embodiments and/or exemplary methods of the present invention are also described herein.

It has been found within the scope of the exemplary embodiments and/or exemplary methods of the present invention that, when the rotational speed of the compressor is known, it is possible to dispense with part of the sensor system necessary for operating the internal combustion engine. Knowledge of the rotational speed of the compressor makes it possible to either determine the ambient pressure so that an ambient pressure sensor may be omitted, or the boost pressure, applied downstream from the compressor and upstream from the throttle device, may be determined, so that a corresponding boost pressure sensor may be omitted.

It is advantageous in particular when the rotational speed is ascertained with the aid of a pressure sensor because the mean static pressure may then additionally be used to determine the ambient pressure and/or the boost pressure applied in the flow direction upstream from the throttle device. In this case, not only the ambient pressure sensor or the boost pressure sensor may be omitted, but it is even possible to omit both sensors altogether.

Furthermore, the exemplary embodiments and/or exemplary methods of the present invention relates to an internal combustion engine, which is particularly suitable for executing an above-named method, and a compressor, in particular an exhaust gas turbocharger, which compresses fresh air that is under ambient pressure, the compressor having a compressor wheel, a diffuser, and a spiral housing for compressed fresh air. A pressure sensor may be provided for determining the rotational speed of the compressor as discussed in German patent document no. DE 10 2005 056 517.4.

The exemplary embodiments and/or exemplary methods of the present invention provides that the pressure sensor is positioned on or in the spiral housing. This positioning has the advantage that, one the one hand, a sufficiently high static pressure may be detected and, on the other hand, the pressure fluctuations applied in this area are sufficiently pronounced to allow the rotational speed of the compressor to be determined as described in German patent document no. DE 10 2005 056 517.4. In this regard, reference is made to the content of German patent document no. DE 10 2005 056 517.4.

For further optimization of the pressure values detectable with the aid of the pressure sensor it is provided that the spiral housing extends in the circumferential direction from a starting area toward an end area which opens to the outlet of the compressor and that the pressure sensor is situated at the starting area of the spiral housing. A sufficiently high static pressure is applied in this area. Moreover, the pressure fluctuations applied in this area are more pronounced than in the end area of the spiral housing in which the pressure fluctuations are less pronounced.

Further advantages, features, and details of the exemplary embodiments and/or exemplary methods of the present invention result from the following description in which exemplary embodiments are described in greater detail with reference to the drawings. The features depicted in the drawings and cited in the claims and in the description may be essential for the invention either individually or in any combination.

DETAILED DESCRIPTION

Figure 1:
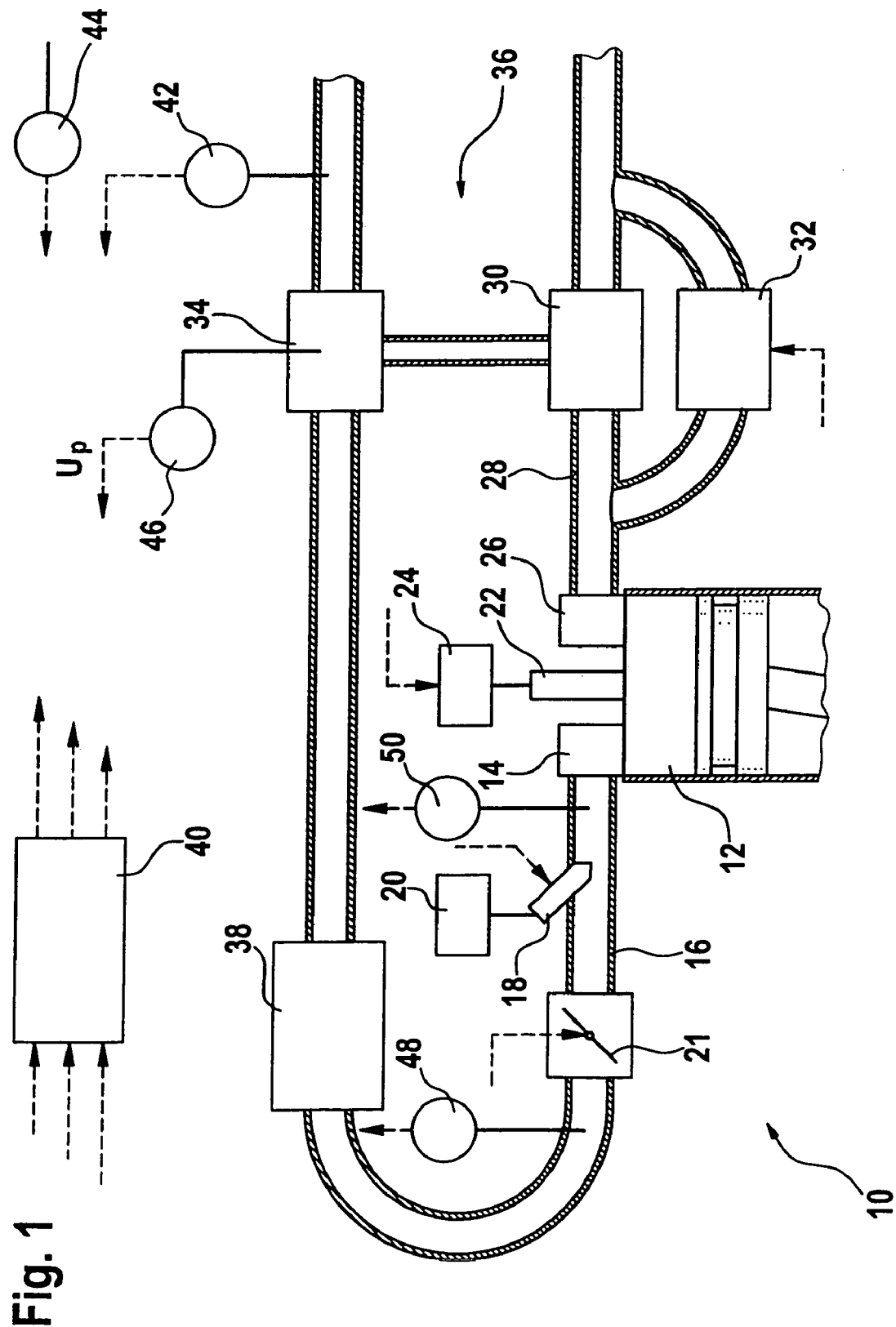
FIG. 1 shows a schematic representation of an internal combustion engine having an exhaust gas turbocharger.

In FIG. 1, an internal combustion engine overall is labeled with reference numeral 10. It is used for driving a motor vehicle (not shown). Internal combustion engine 10 is designed as a gasoline internal combustion engine having intake-manifold fuel injection; however, essential basic contents of the following description also hold true for diesel internal combustion engines, as well as for internal combustion engines having direct fuel injection.

Internal combustion engine 10 includes multiple cylinders, only one of which is represented here, which includes a combustion chamber 12. Combustion air reaches this combustion chamber through an intake valve 14 via an intake port 16. Directly upstream from intake valve 14, fuel is injected through an injector 18, which is connected to a fuel supply system 20, into this intake port. A throttle device 21 is situated in intake port 16 upstream from this injector.

A fuel/air mixture present in combustion chamber 12 is ignited by a spark plug 22 which is connected to an ignition system 24. Hot combustion exhaust gases are discharged from combustion chamber 12 through an outlet valve 26 and an exhaust pipe 28. Situated in this exhaust pipe is a turbine 30 which may be bypassed via a bypass valve ("waste gate") 32.

A compressor 34, which is mechanically connected to turbine 30, is situated in intake port 16 in such a way that, as the turbine wheel of turbine 30 rotates, a compressor wheel of compressor 34 is driven. Turbine 30 and compressor 34 together form an exhaust gas turbocharger 36. For compressing the air, compressor 34 has a plurality of compressor vanes or compressor blades which are, however, not shown in FIG. 1. The intake air, heated by the compression, is cooled by an intercooler 38 which is situated in intake port 16 between compressor 34 and throttle device 21.

The operation of internal combustion engine 10 is controlled and regulated by a control and regulating device 40. In particular throttle device 21, injector 18, ignition system 24, and bypass valve 32 are controlled by control and regulating device 40. The latter receives signals from different sensors for this purpose. All sensors discussed in the following are represented in FIG. 1 for reasons of clarity, for which, however, only differing subsets of sensors are needed.

In particular, a hot-film air mass sensor ("HFM sensor") 42 may be provided which detects the air mass flowing through intake port 16 upstream from compressor 34. Moreover, an ambient pressure sensor 44 may be provided, using which the pressure of the fresh air to be compressed by compressor 34 may be measured.

Furthermore, a pressure sensor 46 is provided in the present exemplary embodiment, using which the rotational speed of exhaust gas turbocharger 36 and optionally also the pressure of the compressed air may be detected directly in compressor 34. This is described in greater detail further below with reference to FIGS. 3 and 4. In other exemplary embodiments, a different type of sensor is provided instead of the pressure sensor which allows the rotational speed of the exhaust gas turbocharger to be ascertained.

Furthermore, a boost pressure sensor 48 may be provided which is situated downstream from compressor 34 and upstream from throttle device 21. In the depicted example, the boost pressure sensor is positioned between intercooler 38 and throttle device 21 in the flow direction.

Finally, the internal combustion engine may be equipped with an intake manifold pressure sensor 50 which is positioned between throttle device 21 and intake valve 14.

Compressor 34 compresses the combustion air supplied to combustion chamber 12 which makes a higher power output of internal combustion engine 10 possible. For this purpose, the power of turbine 30 and thus also of compressor 34 must be varied for different operating points (engine speed, load) of the internal combustion engine by opening bypass valve 32 more or less.

To regulate the power of compressor 34 it is necessary to know the volume flow of fresh air which is compressed by compressor 34. This volume flow may be ascertained by taking into account the mass flow, made available by air mass sensor 42, as well as the density and temperature of the ambient air.

It is alternatively possible to ascertain the volume flow with the aid of a model in which the intake volume of combustion chamber 12 and the camshaft position of internal combustion engine 10 are taken into account. The volume flow may be ascertained with the aid of a pressure value detected by intake manifold pressure sensor 50 and by knowing the temperature of the ambient air. It is also possible to take into account the pressure value over time ascertained with the aid of intake manifold pressure sensor 50 in order to be able to also ascertain non-static volume flows.

The rotational speed of a compressor wheel applied to compressor 34 may be ascertained with the aid of pressure sensor 46. Since the compressor wheel has multiple blades and vanes, the ambient air is not compressed continuously, but rather in waves. The wave frequency divided by the number of blades and vanes of the compressor yields the rotational speed of compressor 34. By knowing this rotational speed, it is possible, for example, to omit the ambient pressure sensor 44 shown on FIG. 1. How the ambient pressure may be derived for different operating states of internal combustion engine 10 is described in the following.

When internal combustion engine 10 is put out of operation, the pressures, applied to different areas of the system represented in FIG. 1, even out each other. This makes it possible to ascertain the ambient pressure prior to start-up of internal combustion engine 10 by either using the pressure signal of boost pressure sensor 48 or also the pressure signal of intake manifold pressure sensor 50.

When internal combustion engine 10 operates in the non-charged state, it is possible to ascertain the ambient pressure with the aid of the pressure signal of boost pressure sensor 48. For this purpose, the pressure change, which results along the flow path from the air filter (not shown), compressor 34, intercooler 38 all the way to boost pressure sensor 48, must be ascertained with the aid of known pressure change equations and added to the pressure value ascertained with the aid of the boost pressure sensor. The small pressure change at compressor 34 may be described by a characteristics map, for example. The volume flow and the rotational speed of compressor 34 are used for addressing the characteristics map.

Figure 2:
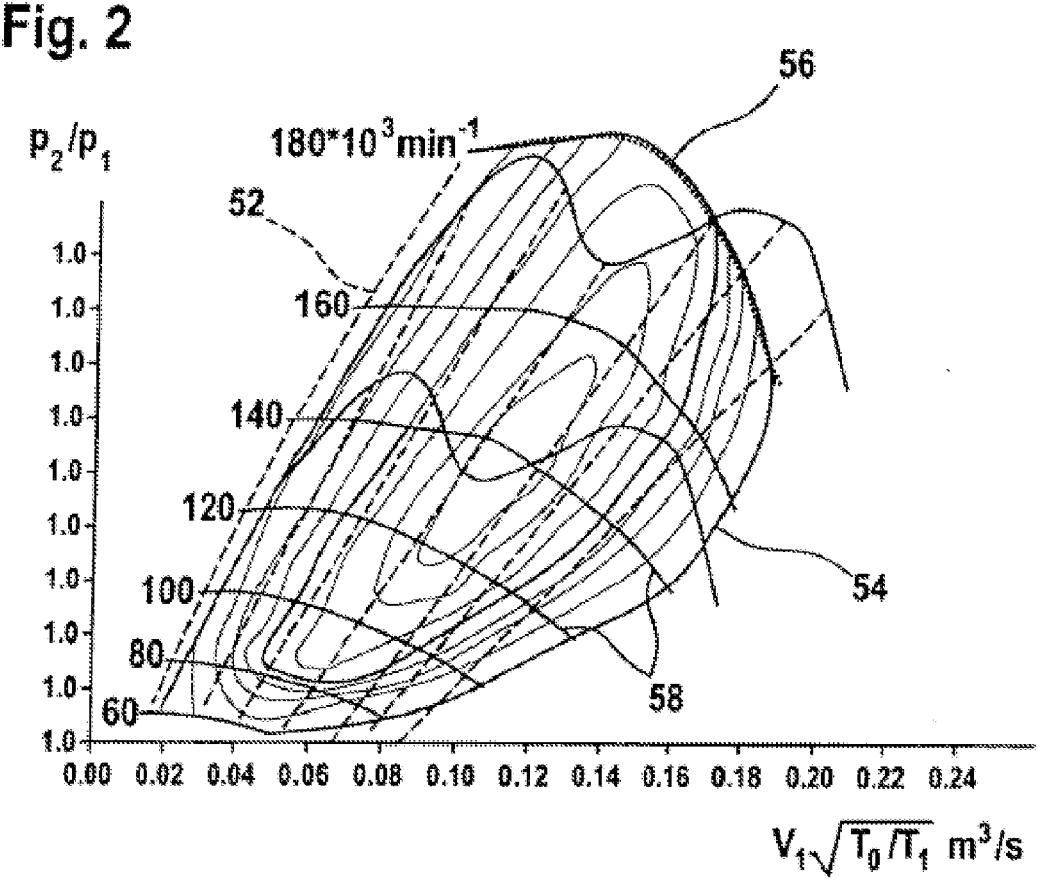
FIG. 2 shows a compressor characteristics map of the exhaust gas turbocharger.

To be able to ascertain the ambient pressure also in the charged state of internal combustion engine 10, a compressor characteristics map of compressor 34 is used which is shown in FIG. 2. The volume flow normalized to the applied ambient temperature is plotted there on the abscissa. The pressure ratio, resulting from division of the pressure values which are applied to the outlet and inlet of compressor 34, is plotted on the ordinate.

The characteristics map shown in FIG. 2 is delimited on the left-hand side by a so-called pumping limit 52. The characteristics map is delimited on the right-hand side by a so-called choke line 54. Moreover, the characteristics map is delimited by a line 56 which indicates the maximum rotational speed of compressor 34. Additional lines 58 are plotted within the characteristics map which each extend between pumping limit 52 and choke line 54 and which each refer to a certain rotational speed of compressor 34.

In order to ascertain the ambient pressure in the charged state of internal combustion engine 10, an estimate is initially assumed which results from the value for the ambient pressure at start-up of internal combustion engine 10, for example. The volume flow shown in FIG. 2 may be ascertained in the above-described manner. Since the rotational speed of compressor 34 is known with the aid of pressure sensor 46, the pressure ratio plotted on the ordinate in FIG. 2 may be ascertained. Pressure p2 applied to the outlet of compressor 34 may be ascertained by using the pressure signal of boost pressure sensor 48 and by taking into account the pressure change over the pipe line and the intercooler. Based on this, Value p1 may be ascertained which is set equal to the ambient pressure. Using this new value for the ambient pressure, the above-described method is run through again in order to iteratively approach a correct value for the ambient pressure.

It is also possible to omit boost pressure sensor 48 and to ascertain the boost pressure prevailing in this area in the manner as described in the following. In the charged state of internal combustion engine 10, value p1 corresponds to the ambient pressure ascertained with the aid of the ambient pressure sensor. With the aid of the volume flow, ascertained as explained above, and with the aid of the known compressor rotational speed, pressure ratio p2/p1 may be ascertained from the compressor characteristics map shown in FIG. 2. In order to ascertain the pressure prevailing in the area of boost pressure sensor 48 (not present in this case), the pressure change must be taken into account based on value p2 which results over the pipe lines and intercooler 38.

Figure 3:
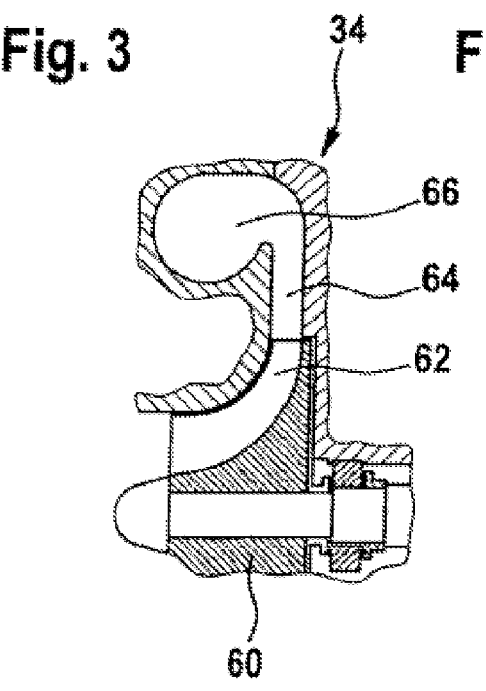
FIG. 3 shows a sectional view of the exhaust gas turbocharger according to a first section plane.
Figure 4:
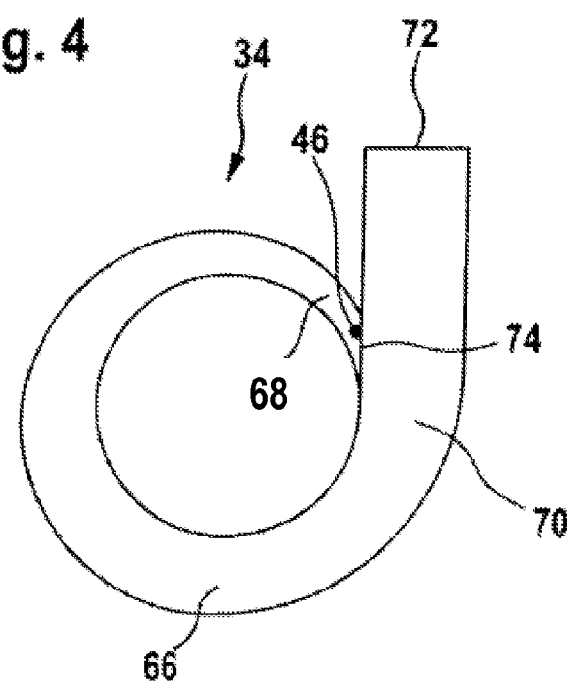
FIG. 4 shows a sectional view of the exhaust gas turbocharger according to a second section plane.

It is then possible with the aid of pressure sensor 48, if—as in the present exemplary embodiment—the rotational speed is ascertained using the signal of pressure sensor 46, to not only determine the rotational speed of compressor 34 but also the static pressure applied to the compressor. Since one may also rely in this case on a measured pressure, the pressure upstream from throttle valve 21 may be modeled particularly well. With further reference to FIGS. 3 and 4, compressor 34 includes a compressor wheel 60 which has blades 62 distributed over its circumference. These blades compress axially drawn-in air and convey it radially to the outside into a diffuser 64, which discharges into a spiral housing 66, schematically shown in FIG. 4, along its circumference. This housing extends in a spiral from a starting area 68 to an end area 70 which discharges to an outlet 72 of compressor 34. Starting area 68 and end area 70 are separated from one another by a separating element 74. It is proposed now to position pressure sensor 46 in starting area 68 of spiral housing 66. The static pressure signal, detectable with the aid of pressure sensor 46, is sufficiently high and the pressure fluctuations, resulting from the rotation of blades 62, are also sufficiently high, so that a static pressure signal as well as the rotational speed of compressor wheel 60 of compressor 34 may be obtained with the aid of pressure sensor 46. The static pressure, ascertained with the aid of pressure sensor 46, may also be used to determine the pressure in the area of ambient pressure sensor 42 and/or of boost pressure sensor 48 or also to carry out a plausibility check.

What is claimed is:

1. A method for operating an internal combustion engine, the method comprising:
   compressing fresh air with a compressor;
   ascertaining an ambient pressure of the fresh air to be compressed by the compressor as a starting value prior to start-up of the internal combustion engine; and
   iteratively:
      determining a boost pressure; and
      ascertaining a revised value of the ambient pressure based on the determined boost pressure and a rotational speed of the compressor;
   wherein the internal combustion engine is controlled based on at least one of the revised values of the ambient pressure.

2. The method of claim 1, wherein the boost pressure is determined using a boost pressure sensor positioned downstream from the compressor.

3. The method of claim 1, wherein the rotational speed of the compressor is ascertained with the aid of a pressure sensor and by taking a mean static pressure into account.

4. The method of claim 1, wherein an ambient pressure or a boost pressure in a charged state of the internal combustion engine is ascertained with the aid of a compressor characteristic map.

5. The method of claim 1, wherein, for ascertaining an ambient pressure, a measured boost pressure is corrected by a pressure value which results from a pressure change in an area between an outlet of the compressor and a boost pressure sensor.

6. The method of claim 1, wherein, for ascertaining a boost pressure, a pressure at an outlet of the compressor ascertained from a compressor characteristic map is corrected by a pressure value which results from a pressure change in an area between the outlet of the compressor and a boost pressure sensor.

7. The method of claim 1, wherein the compressor is a part of an exhaust gas turbocharger.

8. The method of claim 1, wherein the ambient pressure is ascertained while the internal combustion engine operates in a non-charged state based on a boost pressure detected by a boost pressure sensor and a predefined pressure change.

9. The method of claim 8, wherein the ambient pressure is ascertained while the internal combustion engine operates in the non-charged stated based also on a characteristic map of a pressure change at the compressor.

10. The method of claim 1, wherein the compressor includes a spiral housing that extends from a starting area to an ending area, the ending area opening to an outlet of the compressor, and the rotational speed of the compressor is ascertained with the aid of a pressure sensor situated at the starting area of the spiral housing.

11. The method of claim 1, further comprising:
   ascertaining, based on the rotational speed of the compressor and for controlling the internal combustion engine, a boost pressure downstream from the compressor and upstream from a throttle device.

12. The method of claim 11, wherein the boost pressure downstream from the compressor and upstream from the throttle device is determined by:
   ascertaining a volume flow of the fresh air that is compressed by the compressor;
   ascertaining an ambient pressure of the fresh air to be compressed by the compressor;
   ascertaining a ratio of a pressure at an outlet of the compressor to the ascertained ambient pressure based on the volume flow and the rotational speed;
   ascertaining the pressure at the outlet of the compressor based on the ratio and the ascertained ambient pressure; and
   applying a pressure change value to the ascertained pressure at the outlet of the compressor.

13. The method of claim 11, wherein the boost pressure downstream from the compressor and upstream from the throttle device is determined based also on an ascertained volume flow and ambient pressure of the fresh air that is compressed by the compressor.

14. A method for operating an internal combustion engine, the method comprising:
   compressing fresh air with a compressor, the air reaching a combustion chamber of the internal combustion engine via a throttle device;
   determining, by using a rotational speed of the compressor, a pressure variable used for controlling the internal combustion engine;
   wherein:
      the pressure variable is an ambient pressure of the fresh air to be compressed by the compressor;
      the ambient pressure is ascertained as a starting value prior to start-up of the internal combustion engine; and
      iteratively:
         a boost pressure sensor positioned downstream from the compressor and between the compressor and the throttle device is used for determining a boost pressure; and
         a revised value of the ambient pressure is ascertained based on the determined boost pressure and the rotational speed of the compressor.

15. The method of claim 14, wherein, in each iteration, for ascertaining the respective revised value of the ambient pressure, a pressure at an outlet of the compressor is determined based on the previously ascertained value of the ambient pressure and the determined boost pressure.

16. The method of claim 14, wherein:
   the rotational speed of the compressor is ascertained with the aid of a pressure sensor and by taking a mean static pressure into account; and
   a pressure, ascertained with the aid of the pressure sensor, is used for determining at least one of the ambient pressure and the boost pressure applied upstream from the throttle device.

17. The method of claim 14, further comprising:
ascertaining a boost pressure for a position along a flow path which is situated between an intercooler, positioned downstream from the compressor, and the throttle device.

18. The method of claim 14, wherein the ambient pressure is ascertained prior to start-up of the internal combustion engine with the aid of an intake manifold pressure sensor which is positioned downstream from the throttle device and upstream from the combustion chamber.

19. The method of claim 14, wherein the ambient pressure is ascertained in a non-charged state of the internal combustion engine with the aid of a boost pressure measured by a boost pressure sensor which is positioned downstream from the compressor and upstream from the throttle device.

20. The method of claim 19, wherein the boost pressure sensor is positioned between an intercooler situated downstream from the compressor and the throttle device.

21. The method of claim 14, wherein the ambient pressure is ascertained prior to start-up of the internal combustion engine with the aid of one of (a) an intake manifold pressure sensor which is positioned downstream from the throttle device and upstream from the combustion chamber, and (b) a boost pressure sensor positioned between the compressor and the throttle device.

22. A method for operating an internal combustion engine, the method comprising:
compressing fresh air with a compressor, the air reaching a combustion chamber of the internal combustion engine via a throttle device;
determining, by using a rotational speed of the compressor, a pressure variable used for controlling the internal combustion engine;
wherein:
the pressure variable is an ambient pressure of the fresh air to be compressed by the compressor;
the ambient pressure is ascertained prior to start-up of the internal combustion engine with aid of one of (a) an intake manifold pressure sensor positioned downstream from the throttle device and upstream from the combustion chamber and (b) a boost pressure sensor positioned downstream from the compressor and between the compressor and the throttle device;
the ascertained ambient pressure is used as a starting value; and
iteratively:
the boost pressure sensor is used for determining a boost pressure; and
a revised value of the ambient pressure is obtained based on the determined boost pressure and the rotational speed of the compressor.

23. The method of claim 22, wherein the boost pressure sensor is positioned between the throttle device and an intercooler situated downstream from the compressor.

24. A method for operating an internal combustion engine, the method comprising:
compressing fresh air with a compressor, the air reaching a combustion chamber of the internal combustion engine via a throttle device;
determining, by using a rotational speed of the compressor, a pressure variable used for controlling the internal combustion engine;
wherein:
the pressure variable is an ambient pressure of the fresh air to be compressed by the compressor;
the ambient pressure during operation of the internal combustion engine in a charged state is determined by:
ascertaining the ambient pressure while the internal combustion engine is out of operation;
determining a volume flow of the fresh air that is compressed by the compressor; and
iteratively performing the following:
determining a boost pressure downstream of the compressor;
determining a pressure at an outlet of the compressor based on the determined boost pressure and a latest ascertained ambient pressure;
determining a ratio of the pressure at the outlet of the compressor to the latest ascertained ambient pressure based on the determined volume flow and the rotational speed of the compressor; and
ascertaining a new value for the ambient pressure based on the pressure at the outlet of the compressor and the ratio.

25. A method for operating an internal combustion engine, the method comprising:
compressing fresh air with a compressor, the air reaching a combustion chamber of the internal combustion engine via a throttle device;
determining, by using a rotational speed of the compressor, a pressure variable used for controlling the internal combustion engine;
wherein:
the pressure variable is an ambient pressure of the fresh air to be compressed by the compressor;
the ambient pressure during operation of the internal combustion engine in a charged state is determined by:
determining a volume flow of the fresh air that is compressed by the compressor; and
iteratively performing the following:
determining a boost pressure downstream of the compressor;
determining a pressure at an outlet of the compressor based on the determined boost pressure;
determining a ratio of the pressure at the outlet of the compressor to the latest ascertained ambient pressure based on the determined volume flow and the rotational speed of the compressor; and
ascertaining a new value for the ambient pressure based on the pressure at the outlet of the compressor and the ratio.

26. A system for operating an internal combustion engine, the system comprising:
a compressor to compress fresh air;
a sensor for ascertaining a rotational speed of the compressor;
an arrangement for ascertaining an ambient pressure of the fresh air to be compressed by the compressor as a starting value prior to start-up of the internal combustion engine; and
an arrangement for iteratively:
determining a boost pressure; and
ascertaining a revised value of the ambient pressure based on the determined boost pressure and the ascertained rotational speed of the compressor;
wherein at least one of the revised values of the ambient pressure is used for controlling the internal combustion engine.

27. The system of claim 26, wherein the compressor includes an exhaust gas turbocharger.

28. The system of claim 26, wherein the fresh air is pressurized by ambient pressure.

29. The system of claim 26, wherein the compressor has a compressor wheel, a diffuser, and a spiral housing for compressed fresh air.

30. The system of claim 29, wherein the spiral housing extends in the circumferential direction from a starting area to an end area meeting the outlet of the compressor, and a pressure sensor is situated in the starting area of the spiral housing.

31. The system of claim 26, wherein the sensor is a pressure sensor.

* * * * *